United States Patent [19]

Perryman et al.

[11] Patent Number: 4,979,221
[45] Date of Patent: Dec. 18, 1990

[54] METHOD AND APPARATUS FOR SUB-PIXEL CENTROIDING OF A PHOTON EVENT

[75] Inventors: Michael A. C. Perryman, Leiden; Graham C. Cox, Oegstgeest, both of Netherlands

[73] Assignee: Agence Spatiale Europeene, Paris, France

[21] Appl. No.: 289,603

[22] Filed: Dec. 23, 1988

[30] Foreign Application Priority Data

Dec. 23, 1987 [FR] France .................................. 87 18458

[51] Int. Cl.$^5$ .............................................. G06K 9/00
[52] U.S. Cl. ..................................... 382/1; 250/206.1;
358/103; 382/27; 382/48
[58] Field of Search .................... 382/1, 48, 27, 65, 28;
356/153; 250/203 R, 491.1; 358/103

[56] References Cited

U.S. PATENT DOCUMENTS

| | | | |
|---|---|---|---|
| 3,120,578 | 2/1964 | Potter et al. | 382/48 |
| 4,330,705 | 5/1982 | Kollodge | 250/203 R |
| 4,499,597 | 2/1985 | Alues | 382/27 |
| 4,625,330 | 11/1986 | Higgins | 382/27 |
| 4,658,431 | 4/1987 | Yokota | 358/103 |
| 4,805,226 | 2/1989 | Guebey | 382/27 |

Primary Examiner—Leo H. Boudreau
Assistant Examiner—Joseph Mancuso

[57] ABSTRACT

A photon signal received on a CCD is digitized and coupled to a 3×3 pixels data analysis array (DAA). The digital signals read out from the penultimate three pixels of the DAA are used to address a first look up table held in a memory, the digital signals read out from the last three pixels of the DAA are used to address a second look up table held in a memory. The data stored at the two addressed locations are then read out and logically ANDed to produce an output signal only when both ANDed data correspond to a valid photon event. The output signal thus defines the position of the center of the photon signal at a high level of precision.

9 Claims, 1 Drawing Sheet

METHOD AND APPARATUS FOR SUB-PIXEL CENTROIDING OF A PHOTON EVENT

BACKGROUND OF THE INVENTION

The present invention relates to a method and an apparatus for automatically locating the position of photon events on the sensitive imaging array of a two-dimensional charge-coupled device (CCD) at a high level of precision.

A charged-coupled device comprises a photosensitive imaging array which, when a photon is incident thereon, produces a video signal consisting in a sequence of pulses having individual amplitudes proportional to the photon quantity of energy in each sensitive element of the imaging array. Such a device has been used for example in photon counting cameras for use in ground-based astronomical applications where imaging and spectroscopy of faint astronomical objects are important.

As detector technology advances, photon counting systems are expected to become more important, not only in ground-based applications where spatial and temporal resolution are required (e.g. time-resolved imaging, speckle imaging and spectroscopy, optical interferometry, etc.) but also in spaceborne applications where a high sensitivity to incoming light combined with possible time resolution is important.

New generation of sensitive two-dimensional CCD detectors have been combined with image intensifiers and high speed microprocessors for realizing star tracking devices capable of tracking several stars simultaneously. In such spaceborne applications, it is essential to assure a time resolution as high as that afforded by the smaller CCD devices while at the same time providing a large effective imaging area as offered by a detector system with a larger number of picture elements (or pixels). This requires that the location of the photon events is determined and recorded at a high level of precision, in fact at a sub-pixel level of precision.

DESCRIPTION OF THE PRIOR ART

A known method to implement sub-pixel centroiding was disclosed by A. Boksenberg, C.I. Coleman, J. Fordham and K. Shortridge in "Interpolative Centroiding in CCD-based Image Photon Counting Systems", Advances in Electronics and Electron Physics (Adv. E.E.P.), Vol. 64A, 1985. According to this known method, the video signals from the CCD device, after amplification, are converted into digital signals and they are then used to build-up a two-dimensional digital picture for each incoming photon. The digital picture is realized in an array of five shift registers; the last five elements of each shift register are directly accessible, forming a 5×5 data analysis array (DAA). The elements in the DAA are scanned sequentially and their contents are used to calculate the coordinates of the center of the photon event (i.e. the position of the peak signal) by iteratively carrying out substantially complex algorithms. The known algorithms however require a relatively long signal processing time and they do not provide a satisfactory accuracy at the pixel boundaries.

SUMMARY OF THE INVENTION

A first object of this invention is a method for centroiding a photon event with a high level of precision, which is simple to implement and fast to run and which provides a better image quality than methods previously used.

The invention has for second object an apparatus for carrying out the method of the invention, which is simple to implement.

These objects are achieved in accordance with the invention as defined in the appended claims.

The advantage of the system according to this invention is that it provides an increase in the pixel signal processing speed and is adaptable to the form of the amplified photon signal. Further, the invention allows the use of the new generation of sensitive two-dimensional CCD detectors in combination with a signal intensifier in a way which preserves a high time resolution.

Applications beyond the range of optical astronomy are likely, for example as detector behind a NaI crystal which converts incoming X-ray photons into secondary optical photons, night vision devices for military applications, and even in the field of medicine where some important chemical reactions are now known to be photo-luminescent, albeit at very low light levels.

DESCRIPTION OF AN EXEMPLARY EMBODIMENT OF THE INVENTION

A photon event is the detected burst of light as a result of an incident photon. The photon event is detected on a CCD array (charge-coupled device known per se) which produces a video signal comprised of a sequence of pulses the level of which are proportional to the charge received by each sensitive element. The video signal is passed through an analog/digital converter and converted into a stream of serial binary signals which in turn are converted into a two-dimensional digital picture by means of a data analysis array (DAA) comprising a number of shift register elements.

Figure 1:
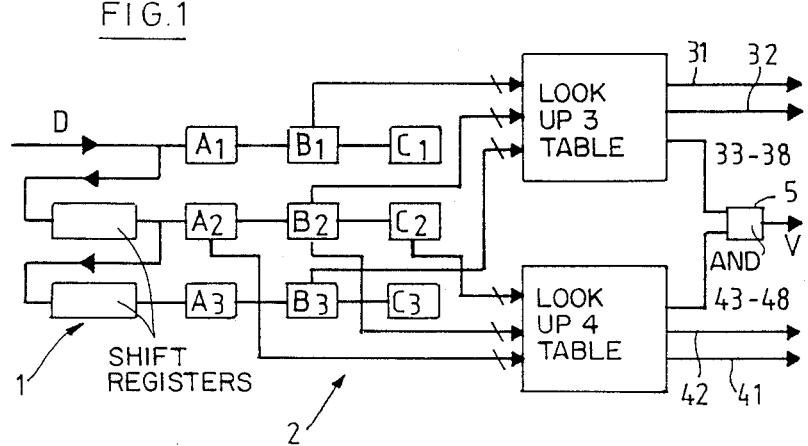
FIG. 1 is a block diagram of the apparatus in accordance with the invention.

Referring to FIG. 1, the stream of binary signals D from a video A/D converter is received sequentially in an array of shift registers 1 forming three rows. The last three elements in the registers are shown individually and labelled $A_1$ $B_1$ $C_1$ $A_2$ $B_2$ $C_2$ $A_3$ $B_3$ $C_3$. The reading process of the CCD array is described in the publication by A. Boksenberg et al referred to in the foregoing. In the apparatus of this invention, the data analysis array 2 has a size of only 3×3 pixels, which is quite sufficient for processing the data in accordance with this invention as will be apparent later herein.

Figure 2:
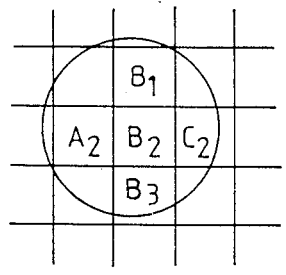
FIG. 2 represents the spot area of a photon event incident onto a CCD imaging array.
Figure 3:
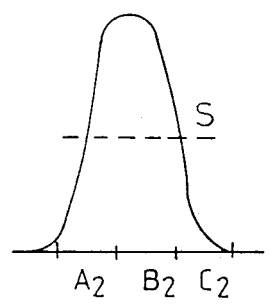
FIG. 3 shows a Gaussian profile of the spot produced by an incident photon.

Assuming that the spot of a photon event has an extent covering an area of approximately 3×3 CCD pixels as shown in FIG. 2 and on the assumption that the spot intensity has a roughly gaussian profile (FIG. 3), then on every reading clock cycle, the peak signal is read out from element $B_2$ located in both the middle horizontal row and the middle vertical column in DDA 2. The object of the method according to this invention is to recognize a valid event in element $B_2$ and locate the position of its center (i.e. the maximum of the gaussian profile) within a quarter of the middle pixel (i.e. pixel $B_2$).

In accordance with this invention, the signal levels are read out on every clock cycle from the three contiguous pixels in the middle vertical column (i.e. pixels $B_1$ $B_2$ $B_3$) and in the middle horizontal row (i.e. pixels $A_2$ $B_2$ $C_2$).

If $N_1$, $N_2$ and $N_3$ are the signal levels in the three contiguous pixels in either the horizontal row or vertical column, and the threshold S is some proportion of the peak level (FIG. 3), then the criteria chosen for a valid photon event is:

| | |
|---|---|
| $N_1 < N_2$ | (1) |
| $N_3 \leqq N_2$ | (2) |
| $N_2 \geqq$ Threshold S | (3) |
| $N_1 > 0$ | (4) |
| $N_3 > 0$ | (5) |

More specifically, the signals in the three pixels $B_1$ $B_2$ $B_3$ are read out to make a binary address to be coupled directly to the address inputs of a look up table 3 for the vertical centroiding. The signals in the three pixels $A_2$ $B_2$ $C_2$ are read out to make a binary address to be coupled directly to the address inputs of a look up table 4 for the horizontal centroiding. The look up tables 3 and 4 are held in Proms (Programmable Read Only Memories). Using 5-bit signals, each look up table contains $2^{15}$ or 32768 locations and stored at each of these locations is a value that has been calculated based on its address.

Each stored value corresponds to one combination of the signal levels $N_1$, $N_2$ and $N_3$ among the possible 32768 combinations and each value consists of three bits, one bit indicates if the binary combination from $N_1$ $N_2$ $N_3$ represents a valid photon event based on equations (1)–(5) and, if true, the other two give its sub-pixel position. Each value is calculated and stored for several different thresholds S in equation (3).

The proms-based look up tables 3 and 4 actually have eight outputs. Two of these (31-32, 41-42) are used to give the sub-pixel position and the other six (33-38, 43-48) are used to give one of six different valid event control bits, for six different thresholds. It will be noted that the sub-pixel position is independent of the threshold chosen. It is possible to select any one of the thresholds remotely.

The two valid event bits from the look up tables 3 and 4 are combined by logically ANDing in AND-gate 5 for producing a valid real event signal V only if both valid event bits are 1, i.e. when both valid event bits are true. The valid real event signal V is used to enable an adder (not shown) for adding the relative sub-pixel positions to the absolute CCD pixel address of the center of the photon event, i.e. the address of pixel $B_2$ in FIG. 2, giving the sub-pixel address to within a quarter of a pixel. The occurrence of the event at the location is then saved in a dedicated memory.

An exemplary embodiment of the invention has been realized and tested using an electronically generated test pattern. The test data appeared to the centroiding logic as a data stream similar to what would be expected from the CCD. Using the test data it has been demonstrated that when an appropriate combination of numbers are centered in the data analysis array that represent a valid photon event, then the system can identify it as a photon event and position it to within a quarter of a pixel and most to within an eighth of a pixel. The test pattern data also showed that events with sizes larger than the optimised width of 1.5 pixel were also almost always centered to within a quarter of a pixel. Such a performance is comparable to what can be obtained with the prior art method disclosed by A. Bocksenberg et al, using 8-bit digitization which requires larger memories.

The performance obtained with this invention evidences a significant improvement in the art. Significantly better performance would be expected when the signal is digitized to more bits rather than five as presently chosen. This would require a greater number of memory locations and should give consistent centroiding to better than an eighth of a pixel.

The embodiment of the invention described in the foregoing is an example given by way of illustrative example and the invention is in no way limited to this example. Accordingly, any modification, variation or equivalent design must be considered as included within the scope of the invention. Thus, for example, the centroiding system described hereinabove is equally applicable to higher-precision centroiding, digitization to more bits than five and arbitrary but known event profiles.

We claim:

1. A method of defining the position of the center of a light signal received on a charge-coupled device, comprising the steps of:

digitizing the light signal into a stream of digital signals each representing a respective pixel, sequentially coupling the stream of digital signals to an array of shift registers, in which the last three elements of each shift register are directly accessible to form a three row by three column data analysis array (DAA), reading out said digital signals from the penultimate three elements in the three rows of said DAA and the last three elements in the middle row of said DAA, providing a first look up table storing data signals each corresponding to a distinct combination of signal levels of said digital signals from said penultimate three elements of the DAA, each data signal comprising information identifying a particular position in a column of the DAA and a valid event signal to indicate in a true state thereof that a valid light signal is represented by said digital signals, providing a second look up table storing data signals each corresponding to a distinct combination of signal levels of said digital signals from said last three elements in the middle row of the DAA, each data signal comprising information identifying a particular position in a row of the DAA and a valid event signal to indicate in a true state thereof that a valid light signal is represented by said digital signals, using the signals read out from said penultimate three elements to address the first look up table to produce corresponding data signals stored therein, using the signals read out from said last three elements in the middle row to address the second look up table to produce corresponding data signals stored therein, and concurrently using the data signals produced by said first and second look up tables to determine the relative position of the center of the light signal only when both valid event signals are true, thus indicating a valid light signal.

2. An apparatus for defining the position of the center of a light signal received on a charge-coupled device, comprising:
  digitizing means for digitizing the light signal from the charge-coupled device and producing a stream of digital signals each representing a respective pixel,
  an array of shift registers to receive the stream of digital signals, the last three elements of each shift register being directly accessible to form a three row by three column data analysis array (DAA) of said digital signals representing a 3×3 pixel array,
  reading means for reading out digital signals from the penultimate three elements in the three rows of said DAA and digital signals from the last three elements in the middle row of said DAA,
  first look up table means for storing data signals each corresponding to a distinct combination of signal levels of said digital signals in said penultimate three elements of the DAA, each data signal comprising information identifying a particular position in a column of the DAA and a valid event signal to indicate in a true state thereof that a valid light signal is represented by said digital signals,
  second look up table means for storing data signals each corresponding to a distinct combination of signal levels of said digital signals in said last three elements in the middle row of the DAA, each data signal comprising information identifying a particular position in a row of the DAA and a valid event signal to indicate in a true state thereof that a valid light signal is represented by said digital signals,
  first coupling means for providing the digital signals stored in the penultimate three elements of the DAA to three respective address inputs of the first look up table means,
  second coupling means for providing the digital signals stored in the last three elements in the middle row of the DAA to three respective address inputs of the second look up table means, and
  logic AND-gate means for logically ANDing an output signal from the first look up table means with an output signal from the second look up table means to produce a valid real event signal only when both ANDed input signals represent a valid light signal.

3. An apparatus according to claim 2, wherein the logic AND-gate means is coupled for ANDing a plurality of pairs of output signals from the first and second look up table means.

4. A method of defining the position of the center of a light signal received on a charge-coupled device, comprising the steps of:
  digitizing the light signal to form a stream of digital signals representative thereof;
  arranging said digital signals in a data analysis array having at least one row including three of said digital signals and at least one column including three of said digital signals;
  providing first look up table means for storing a plurality of row data each corresponding to a distinct combination of said digital signals of said at least one row, each of said row data including information identifying a particular light signal position in said at least one row and a valid event signal indicating whether said digital signals of said at least one row represent a valid light signal;
  providing a second look up table means for storing a plurality of column data each corresponding to a distinct combination of said digital signals of said at least one column, each of said column data including information identifying a particular light signal position in said at least one column and a valid event signal indicating whether said digital signals of said at least one column represent a valid light signal;
  utilizing said digital signals of said at least one row to address said first look up table means to produce row data corresponding to said digital signals of said at least one row;
  utilizing said digital signals of said at least one column to address said second look up table means to produce column data corresponding to said digital signals of said at least one column;
  utilizing said valid event signal of said row data and said valid event signal of said column data together to determine the receipt of a valid light signal; and
  utilizing said row data and said column data to determine the relative position of said light signal.

5. The method of claim 4, wherein:
  the step of digitizing the light signal comprises forming said digital signals to represent respective pixels of said charge coupled device; and
  wherein the steps of providing said first and second look up table means comprise providing said first and second look up table means respectively storing row data and column data each including information identifying at least a sub-pixel position of said light signal.

6. The method of claim 4, wherein:
  the steps of providing said first and second look up table means comprise providing said first and second look up table means respectively storing row data and column data each including a plurality of valid event signals each indicating the presence of a valid light signal based upon a respective threshold level; and
  the step of utilizing said valid event signals to determine the receipt of a valid light signal comprises utilizing respective valid event signals of said row and column data each based upon the same threshold level to determine the receipt of a valid light signal.

7. An apparatus for defining the position of the center of a light signal received on a charge-coupled device, comprising:
  means for digitizing the light signal for form a stream of digital signals representative thereof;
  means for arranging said digital signal in a data analysis array having at least one row including three of said digital signals and at least one column including three of said digital signals;
  first look up table means for storing a plurality of row data each corresponding to a distinct combination of said digital signals of said at least one row, each of said row data including information identifying a particular light signal position in said at least one row and a valid event signal indicating whether said digital signals of said at least one row represent a valid light signal;
  second look up table means for storing a plurality of column data each corresponding to a distinct combination of said digital signals of said at least one column, each of said column data including information identifying a particular light signal position in said at least one column and a valid event signal indicating whether said digital signals of said at least one column represent a valid light signal;

means for applying said digital signals of said at least one row to address said first look up table means to produce row data corresponding to said digital signals of said at least one row;

means for applying said digital signals of said at least one column to address said second look up table means to produce column data corresponding to said digital signals of said at least one column;

means for determining the receipt of a valid light signal based upon the receipt of a valid event signal from said first look up table means together with the receipt of a valid event signal from said second look up table means; and means for determining a relative position of said light signal based upon said row data and said column data.

8. The apparatus of claim 7, wherein:

said means for digitizing the light signal comprises means for forming said digital signals to represent respective pixels of said charge coupled device; and said first and second look up table means comprise respective means for storing row data and column data each including information identifying at least a sub-pixel position of said light signal.

9. The apparatus of claim 7, wherein:

said first and second look up table means comprise respective means for storing row data and column data each including a plurality of valid event signals each indicating the presence of a valid light signal based upon a respective threshold level; and said means for determining the receipt of a valid light signal comprises means for utilizing both of the respective valid event signals of said row and column data each based upon the same threshold level to determine the receipt of a valid light signal.

* * * * *